Jan. 25, 1966   S. B. WILLIAMS ETAL   3,230,719
FUEL GOVERNOR
Filed May 6, 1963   2 Sheets-Sheet 1
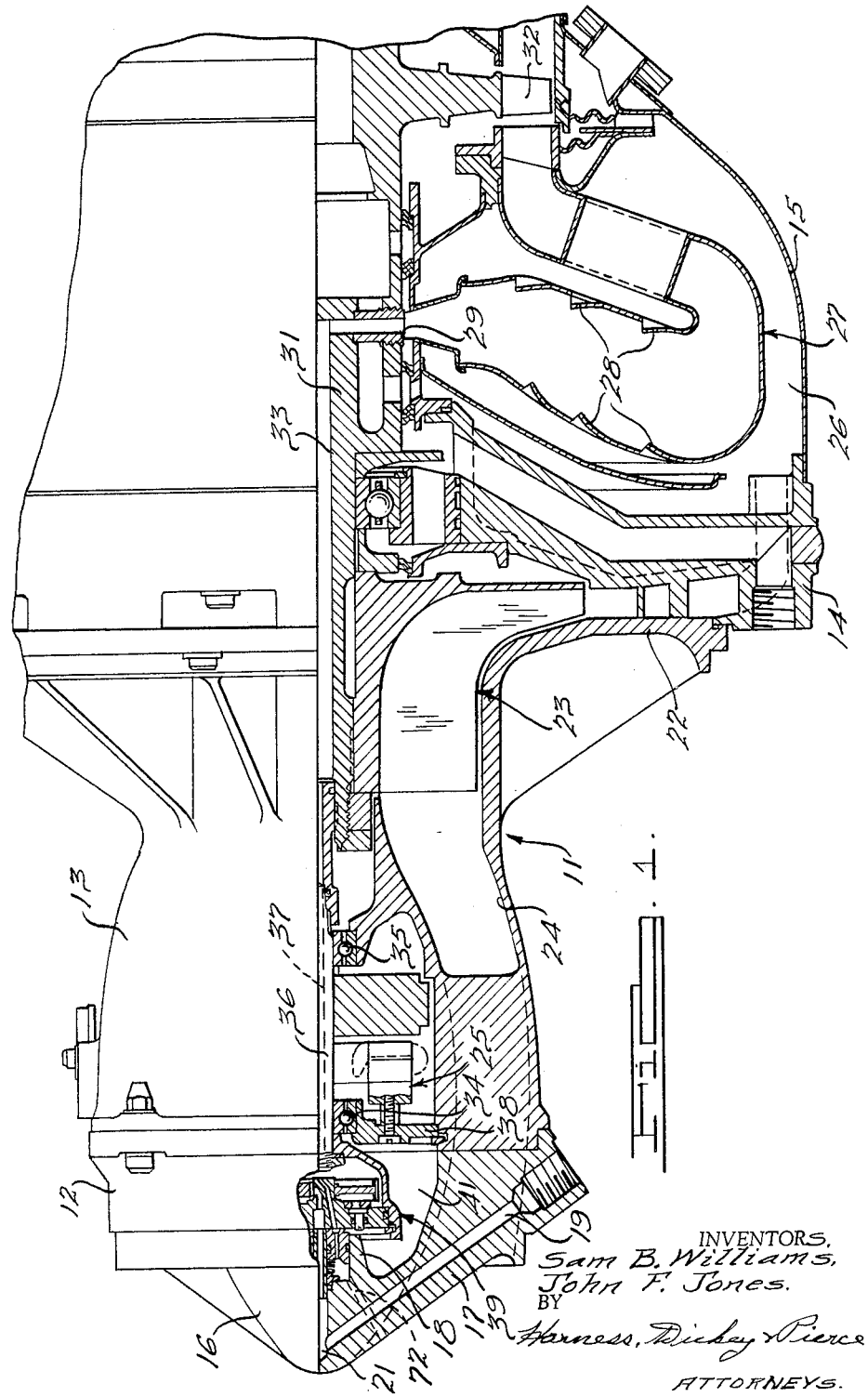
INVENTORS.
Sam B. Williams,
John F. Jones.
BY
Harness, Dickey & Pierce
ATTORNEYS.

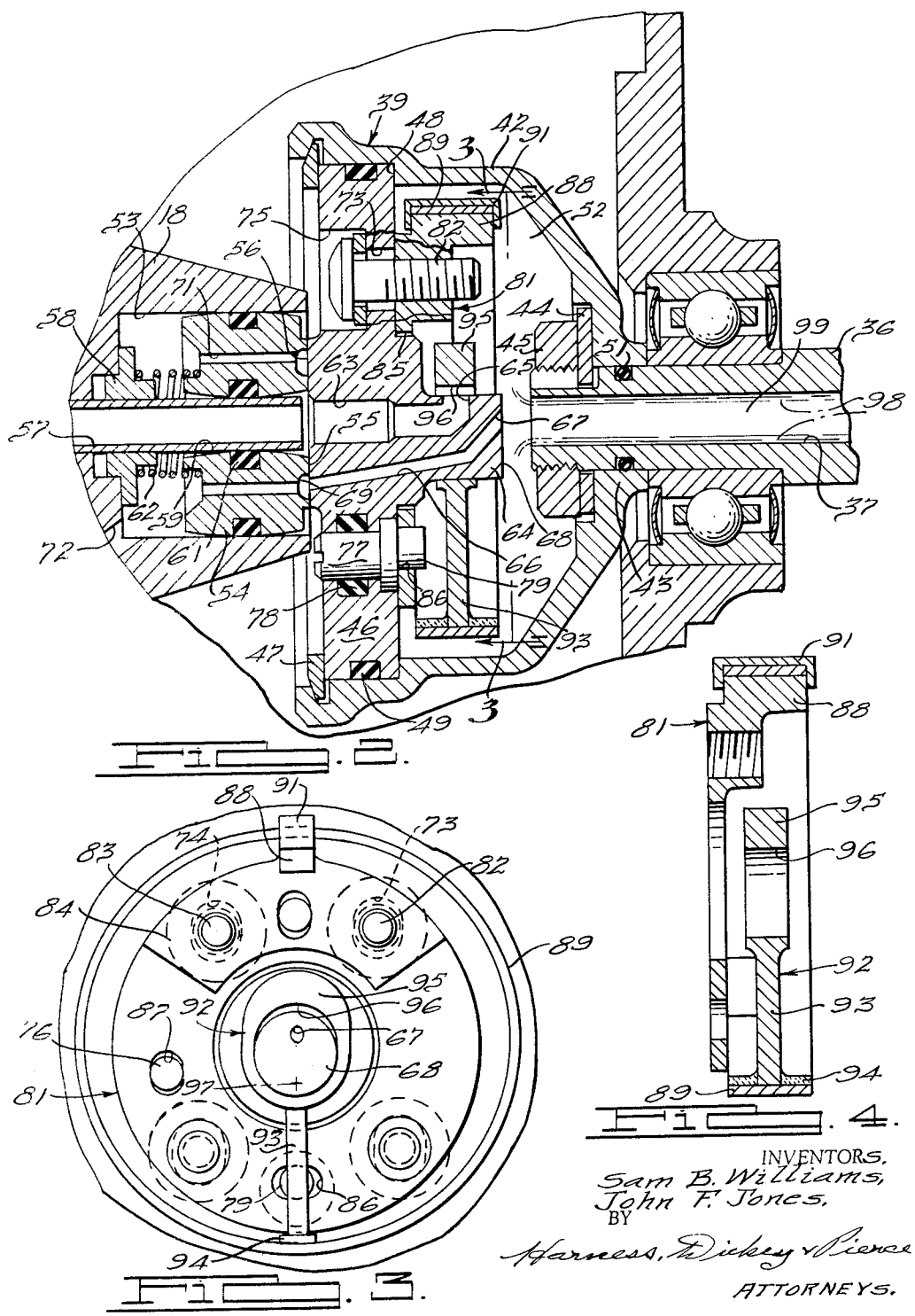

United States Patent Office 3,230,719
Patented Jan. 25, 1966

3,230,719
FUEL GOVERNOR
Sam B. Williams, Walled Lake, and John F. Jones, Berkley, Mich., assignors to Williams Research Corporation, Walled Lake, Mich., a corporation of Michigan
Filed May 6, 1963, Ser. No. 278,338
7 Claims. (Cl. 60—39.28)

This invention relates to fuel governors, and more particularly to governors for controlling the speed of gas turbines or the like.

It is an object of the invention to provide a novel and improved fuel governor which is especially adapted for gas turbines and may be mounted directly on the rotor shaft, thus eliminating the necessity and expense of a gear reduction arrangement.

It is another object to provide an improved fuel governor of this nature which is of simple and inexpensive construction and is of light weight, thus being especially useful for small gas turbine engines, and those having shaft-fed fuel nozzles for the combustion chamber.

It is a further object to provide an improved fuel governor of this character which is extremely reliable in use, can be adjusted to various settings, and has relatively few moving parts.

Other objects, features, and advantages of the present invention will become apparent from the subsequent description, taken in conjunction with the accompanying drawings, in which:

FIGURE 1 is a partially sectioned fragmentary side elevational view of a portion of a gas turbine engine incorporating the novel fuel governor of this invention;

FIGURE 2 is an enlarged fragmentary side elevational view in cross section of the fuel governor;

FIGURE 3 is a rear elevational view of the spring and spring support taken along the line 3—3 of FIGURE 2; and FIGURE 4 is a side elevational view in cross section of the spring support, spring and counterweight-valve member.

Briefly, the illustrated embodiment of the invention comprises a housing keyed to the shaft of a gas turbine engine at the forward end thereof, the housing having a body with a central fuel inlet leading axially and then radially into the chamber formed by the housing. A hoop-shaped spring is mounted within the housing and carries a counterweight-valve member which is secured to the inner spring surface and extends inwardly, the inner portion of this member having a bore within which the body portion having the radial fuel exit is disposed. A central passage leads from the fuel governor housing through the turbine shaft, and an air relief passage is formed in the body, having a centrally located entrance to remove air from the central space created by the centrifugal force which will hold the fuel away from the center of the housing.

In operation the spring force will be such as to normally hold the valve member away from the fuel exit. The center of gravity of the valve member is however eccentrically located with respect to the axis of rotation, so that when a predetermined speed is reached, the spring force will be fully counteracted, a further increase in speed causing the valve member to close the fuel inlet port. Means are provided for adjusting the initial stress of the spring, thereby preselecting the shaft speed at which the governor will reduce fuel flow. The reduction in fuel flow will of course normally result in a reduction in shaft speed, thereby permitting the spring to again withdraw the valve member from the fuel inlet passage.

Referring more particularly to the drawings, the gas turbine is generally indicated at 11 and includes a vaned entrance housing 12, a compressor housing 13, a diffuser housing 14, and a main housing 15. Entrance housing 12 comprises a nose-shaped portion 16 with vanes 17 extending outwardly and rearwardly and a central rearward extension 18. A fuel passage 19 is provided in one of the vanes, the fuel passage extending inwardly to a central bore, indicated at 21.

Compressor housing 13 has a radially extending rearward portion 22 enclosing a compressor generally indicated at 23, and a substantially axially extending portion which has intake air passages 24 and within which is mounted an electric generator generally indicated at 25.

The passages in diffuser section 14 are adapted to lead the compressed air from compressor 23 into the annular chamber 26 within housing 15 which surrounds a combustion chamber generally indicated at 27. Chamber 27 is of annular shape, the air entering the chamber through louvers 28, with fuel entering the chamber radially outwardly from fuel nozzles 29. These nozzles are mounted in a compressor shaft 31 which connects the first stage turbine 32 with compressor 23, shaft 31 having a central passage 33 for conducting the fuel to nozzles 29.

A pair of axially spaced bearings 34 and 35 mounted in compressor housing 13 rotatably support a shaft extension 36 which is secured to compressor shaft 33, shaft extension 36 having a central passage 37 contiguous with passage 33. A plate 38 is secured within the forward portion of compressor housing 14 and supports bearing 34, shaft 36 extending forwardly therethrough.

The novel fuel governor of this invention is generally indicated at 39 and is disposed within a chamber 41 formed on the interior of entrance housing 12, this housing being secured to housing 13 immediately forwardly of plate 38. The construction of governor 39 is best seen in FIGURES 2, 3 and 4. Governor 39 comprises an annular housing 42 having a hub 43 secured to shaft extension 36 by means of a key 44 and a nut 45, and is therefore rotatable with shaft extension 36. The wider forward end of housing 42 encloses a body 46 of circular shape which is secured within the housing by a tapered wedge snap ring 47, the snap ring urging body 46 against a shoulder 48 within housing 42. A seal 49 is carried by body 46 and another seal 51 is carried by shaft extension 36 and engages hub 43, these seals preventing leakage from the fuel chamber 52 formed by housing 42.

Extension 18 of entrance housing 12 has a central rearwardly facing recess 53 which encloses a block 54 having a smooth rearwardly facing surface 55 slidably engageable with the forwardly facing surface of block 46. A tube 57 is secured by a bushing 58 within passage 21 in housing 12 and extends rearwardly therefrom into a central passage 59 in block 54, the block carrying a seal 61 engageable with tube 57. A helical coil compression spring 62 is disposed between bushing 58 and block 54, urging the block rearwardly.

The rearward end of tube 57 is adjacent to and aligned with the axial portion of a fuel inlet passage 63 within block 46. Passage 63 extends axially rearwardly into a rearward extension 64 of block 46, extension 64 being of circular shape offset downwardly in FIGURE 2 from the turbine axis. Passage 63 curves upwardly in FIGURE 1 into a radial direction as it enters extension 64, having a mouth 65 opening onto the cylindrical surface of extension 64.

An air relief passage 66 is also provided in block 46, this passage having an entrance 67 centrally located on the flat rearward end 68 of extension 64, and extending forwardly through the block in an angular fashion to the forward surface 56 thereof. An annular groove 69 is formed on the rearwardly facing surface 55 of block 54, and a plurality of axially extending passages 71 connect groove 69 with the forward end of the block, thereby connecting groove 69 with the space within recess 53. The passage shown partially at 72 extends forwardly from recess 53 to the outer surface of housing 12.

A pair of vertically elongated apertures 73 and 74 are formed in the upper portion of body 46, the body having counterbores 75 in alignment with these apertures as seen in FIGURE 2. A pin 76 is secured to one side of body 46 and extends rearwardly therefrom, as seen in FIGURE 3. Another pin 77 is rotatably mounted in the lower portion of body 46, a seal 78 surrounding pin 77. This pin has an eccentric extension 79 extending rearwardly from body 46, as seen in FIGURE 2. The purpose of apertures 73 and 74, counter bores 75 and pins 76 and 77 is described below.

A spring support generally indicated at 81 is mounted on the rearwardly facing surface of body 46 by means of a pair of bolts 82 and 83 passing through apertures 73 and 74 respectively, and threaded into spring support 81. The latter is of circular and generally disc-like shape with an arcuate thicker portion 84 at the upper end thereof and receiving bolts 82 and 83. The bolts may be tightened to frictionally secure spring support 81 to body 46, or may be loosened to permit vertical movement thereof as later described. A central clearance aperture 85 in spring support 81 surrounds extension 64 of body 46, aperture 85 being of sufficient size to permit these vertical adjusting movements of the spring support. Eccentric 79 is rotatably mounted in an aperture 86 so that rotation of pin 77 will cause vertical movement of spring support 81 with respect to body 46; aperture 86 is horizontally elongated to permit movement of pin eccentric 79. Pin 76 is received within a vertically extending elongated aperture 87 in spring support 81.

A perch 88 extends rearwardly from the upper end of spring support 81 and serves to support a hoop-shaped spring 89. Spring 89 is fabricated of resilient metal having spring-like qualities and comprises a wide flat band looped to form an endless ring. Perch 88 extends somewhat above the outer diameter of support 81, and the diameter of ring 89 is such that its lower end will be below the outer diameter of support 81. A clip 91 of inverted channel shape is mounted over the upper end of ring 89 and is brazed to perch 91, securing the ring thereto.

A counterweight-and-valve member generally indicated at 92 is secured to the inner surface of ring 89 at its lowermost point (diametrically opposite perch 88) and extends upwardly therefrom. Member 92 comprises a mounting section 93 of post-like shape brazed at 94 to ring 89, and a valve section 95 extending above section 93. Valve section 95 is of vertically elongated elliptical shape, being somewhat thicker than mounting section 93 and having a vertically elongated clearance aperture forming an internal surface 96 which surrounds extension 64 of body 46. As seen in FIGURE 2, the upper portion of surface 96 is wider than and in opposed relation with mouth 65 of fuel inlet passage 63, the curvature of surface 96 being approximately the same as the curvature of the surface of extension 64, as seen in FIGURE 3. The sides of surface 96 are in sliding engagement with extension 64.

The shape of spring 89 is such that when spring support 81 is properly adjusted, the lower portion of surface 96 will engage the underside of extension 64, maintaining a spaced relationship between mouth 65 and the upper portion of surface 96, and thus permitting free flow of fuel from passage 63 into chamber 52. This may be accomplished by making spring 89 very slightly elliptical in its unstressed condition, with the major axis of the ellipse being horizontal, as seen in FIGURE 3, and elongating the spring vertically to arrive at the adjusted position, upon which the spring will have been made practically circular.

The center of gravity of member 92 is below the axis of rotation as seen in FIGURE 3; that is, it is between the axis of rotation and the connection 94 between member 92 and ring 89. The exact distance between the axis of rotation and the center of gravity of member 92 will depend upon the exact construction of the parts; for illustrative purposes, the center of gravity of member 92 is indicated at 97 in FIGURE 3. The shape of spring 89, and its position with respect to the axis of rotation, are such that its own mass will create solely, or at least primarily, tensile forces in the spring when it is subjected to rotation, bending or shear forces being created in the spring solely by its interaction with counterweight-valve member 92. As illustrated, the center of gravity of spring 89 is substantially at the axis of rotation. Thus, the spring will be extremely resistant to self-distortion due to centrifugal forces, but will still be quite deformable in response to forces created by member 92.

Upon operation of gas turbine engine 11, housing 39 will rotate together with body 46, spring support 81 and the parts secured thereto. Fuel will flow through tube 57 and passage 63 into chamber 52, and from chamber 52 into passage 37 within shaft extension 36. Due to centrifugal forces, the fuel, which is indicated at 98 in FIGURE 2, will tend to be held against the walls of passage 37 and chamber 52, creating an air space 99 in the center of passage 37 and chamber 52, entrance 67 of air relief passage 66 being in this air space and therefore being capable of receiving air for release to the atmosphere. If required, an annular filler member (not shown) may be mounted in chamber 52 in order to reduce the volume thereof and insure proper flow of fuel from this chamber into passage 37.

As long as the turbine shaft speed is below the predetermined limit set by the adjusted position of spring support 81 on body 46, surface 96 of member 92 will be in spaced relation with mouth 65 of passage 63, permitting free flow of fuel into chamber 52. When the predetermined speed is reached, the centrifugal force on counterweight-valve member 92 will counterbalance the inward force on member 92 created by spring 89. A further increase in speed will therefore cause spring 89 to be distorted, the lower portion of the spring as seen in FIGURE 3, moving away from the axis of rotation. Member 92 will move similarly, and surface 96 will approach mouth 65 of passage 63 and close or restrict the passage.

The resulting decrease in fuel flow will tend to reduce the engine rotational speed, and the reduced speed will permit spring 89 to move member 92 away from passageway mouth 65, again increasing the fuel flow. The governing action will thus take place in a continuous manner.

It should be observed that the amount of preload on spring 89 which determines the force exerted inwardly on member 92 will also determine the governing speed; the higher the preload force, the higher the governing speed. In the illustrated embodiment of the invention, the amount of adjustment available for the spring preload will be sufficient to permit compensation for manufacturing tolerances, so that the maximum speed of engine 11 may be finely adjusted. The principles of the invention however, are applicable to governors used for other purposes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a governor for use in conjunction with a rotary engine, a housing, means mounting said housing on the axis of rotation of said engine for rotation therewith, a fuel inlet passage in said housing having a radially extending exit mouth, an arcuate spring secured within said housing, the shape and position of said spring being such that primarily tensile forces will be created therein in response to housing rotation, said passageway exit mouth being disposed closer to said axis of rotation than said spring, a counterweight-valve member secured at one end to said spring and extending inwardly therefrom, said member having a surface portion in opposed relation with said exit mouth, said spring being prestressed to normally urge said member toward a position in which said surface portion and mouth are in spaced relation, the center of gravity of said member being so located with respect to the axis of rotation as to counterbalance the force created by said prestressed spring when a predetermined rotational speed is reached, whereby a further increase in speed will cause said member surface portion to move toward a closed position with respect to said mouth.

2. The combination according to claim 1, said housing being further provided with a body closing one end of the housing and having an axial extension, the exit mouth of said passageway being located in said extension, said member comprising an elongated apertured portion surrounding said extension and within which the extension is disposed.

3. The combination according to claim 1, further provided with a spring support secured to said housing, said spring being hoop-shaped, means securing said spring to said support at a point diametrically opposite the connection between said spring and counterweight-valve member, and means for adjusting the position of said spring support with respect to said housing along the diameter extending through said connection.

4. The combination according to claim 1, further provided with an air relief passage in said housing having an entrance located substantially at the axis of rotation, and means for conducting air from said passage to a stationary portion of the engine.

5. In a governor for use in conjunction with a rotary engine, a housing, means mounting said housing on the axis of rotation of said engine for rotation therewith, a fuel inlet passage in said housing having an exit mouth, an arcuate spring secured within said housing, the shape and position of said spring being such that primarily tensile forces will be created therein in response to housing rotation, said passageway exit mouth being disposed closer to said axis of rotation than said spring, a counterweight-valve member secured at one end to said spring and extending inwardly therefrom, said member having a surface portion in opposed relation with said exit mouth, said spring being prestressed to normally urge said member toward a position in which said surface portion and mouth are in spaced relation, the center of gravity of said member being so located with respect to the axis of rotation as to counter balance the force created by said prestressed spring when a predetermined rotational speed is reached, whereby a further increase in speed will cause said member surface portion to move toward a closed position with respect to said mouth.

6. In a fuel governor for use in conjunction with a gas turbine engine having a shaft with a central fuel passageway, a housing secured to said shaft for rotation therewith and forming a chamber connected with said passageway, a fuel inlet passageway formed in said housing and having an axial entrance portion and a radially extending exit mouth, a stationary member carried by said engine and having a slidable connection with said housing surrounding said fuel inlet passageway, means for delivering fuel through said member to said fuel inlet passageway, a spring support of generally circular shape secured within said housing, means for adjusting the position of said spring support along a diameter at right angles to the axis of engine rotation, a hoop-like spring within said housing chamber, said spring support having a perch on said diameter supporting one end of said spring, a counterweight-valve member secured to said spring diametrically opposite said perch and extending inwardly therefrom, said last-mentioned member having a surface portion is opposed relation with said fuel passageway exit mouth and being movable between positions opening and closing said exit mouth, said spring being prestressed to normally urge said member to its open position, means on said member and housing defining said open position, the center of gravity of said member and spring being so located with respect to said axis of engine rotation as a counterbalance the force created by the spring prestress upon attainment of a predetermined rotational speed, whereby an increase beyound said predetermined speed will cause said member to move toward its closed position, an air relief passageway in said housing having an entrance located substantially at the axis of engine rotation, and means for conducting air from said passageway to a stationary portion of the engine.

7. In a governor for use in conjunction with a gas turbine engine having a shaft with a central fuel passageway leading to outwardly directed fuel nozzles, a housing secured to said shaft for rotation therewith and forming a chamber connected with said passageway, a fuel inlet passage in said housing having an exit mouth, a spring secured within said housing, said spring being hoop-shaped and positioned with respect to the shaft axis so that the mass of said spring will create at least primarily tensile forces in said spring when subjected to rotation, and counterweight-valve means conected to said spring and movable between positions opening and closing said mouth, said spring being prestressed to urge said means to its open position, the center of gravity of said means being substantially eccentrically located iwth respect to the shaft axis and said spring as to cause bending deflection of said spring upon attainment of a predetermined rotational speed to permit said means to move to its closed position.

References Cited by the Examiner

UNITED STATES PATENTS

| 1,003,708 | 9/1911 | Coleman | 60—39.28 X |
| 2,846,846 | 8/1958 | Mock | 60—39.28 |
| 2,981,321 | 4/1961 | Freeman | 60—39.28 |
| 3,088,476 | 5/1963 | Kellner | 137—56 |
| 3,132,660 | 5/1964 | Sladek | 137—56 |
| 3,159,254 | 12/1964 | Weir | 137—56 X |

FOREIGN PATENTS 716,254  10/1961  Great Britain.

JULIUS E. WEST, *Primary Examiner.*

SAMUEL LEVINE, *Examiner.*

UNITED STATES PATENT OFFICE
CERTIFICATE OF CORRECTION

Patent No. 3,230,719              January 25, 1966

Sam B. Williams et al.

It is hereby certified that error appears in the above numbered patent requiring correction and that the said Letters Patent should read as corrected below.

Column 6, line 15, for "is" read -- in --; line 22, for "a" read -- to --; line 25, for "beyound" read -- beyond --; line 46, for "iwth" read -- with --.

Signed and sealed this 31st day of January 1967.

(SEAL)
Attest:

ERNEST W. SWIDER
Attesting Officer

EDWARD J. BRENNER
Commissioner of Patents